United States Patent
Gullá et al.

(10) Patent No.: US 10,099,946 B2
(45) Date of Patent: Oct. 16, 2018

(54) METHOD FOR TREATING INDUSTRIAL WASTE WATERS

(75) Inventors: Andrea F. Gullá, Shaker Heights, OH (US); Mariachiara Benedetto, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 214 days.

(21) Appl. No.: 13/005,651

(22) Filed: Jan. 13, 2011

(65) Prior Publication Data

US 2011/0108436 A1 May 12, 2011

Related U.S. Application Data

(63) Continuation of application No. PCT/EP2009/058945, filed on Jul. 14, 2009.

(30) Foreign Application Priority Data

Jul. 15, 2008 (IT) .............................. MI2008A1282

(51) Int. Cl.
*C02F 1/467* (2006.01)
*C02F 1/461* (2006.01)
*C02F 101/30* (2006.01)
*C02F 101/32* (2006.01)

(52) U.S. Cl.
CPC .......... *C02F 1/4672* (2013.01); *C02F 1/4676* (2013.01); *C02F 2101/30* (2013.01); *C02F 2101/306* (2013.01); *C02F 2101/32* (2013.01); *C02F 2201/46165* (2013.01)

(58) Field of Classification Search
CPC .......... C25B 15/02; C02F 1/461; C02F 1/467; C02F 1/4672; C02F 1/4676
USPC ........................ 205/688, 442, 456
See application file for complete search history.

(56) References Cited

U.S. PATENT DOCUMENTS

| | | | | |
|---|---|---|---|---|
| 4,131,526 A | * | 12/1978 | Moeglich | 205/753 |
| 4,422,917 A | * | 12/1983 | Hayfield | C25C 7/02 204/196.01 |
| 4,443,309 A | * | 4/1984 | Van Duin et al. | 205/702 |
| 4,702,804 A | * | 10/1987 | Mazur | A62D 3/11 205/352 |
| 5,292,409 A | * | 3/1994 | Dixon | A62D 3/115 204/290.03 |
| 5,587,058 A | * | 12/1996 | Gorodetsky | C25B 11/0484 204/290.09 |
| 6,328,875 B1 | * | 12/2001 | Zappi | C02F 1/46109 204/275.1 |
| 6,352,635 B2 | * | 3/2002 | Krumel et al. | 205/426 |
| 2003/0226766 A1 | * | 12/2003 | Orlebeke | 205/688 |

OTHER PUBLICATIONS

A. Özcan, Y. Şahin, A.S. Koparal, M.A. Oturan. "Degradation of picloram by the electro-Fenton process." Sep. 2007. Journal of Hazardous Materials. vol. 153, Issues 1-2. pp. 718-727.*
Cong, Y., Wu, Z., Tan, T. "Dechlorination by combined electro-chemical reduction and oxidation." May 2005. Journal of Zhejiang University Science B. vol. 6, Issue 6. pp. 563-568.*
Rajeshwar, K., Ibanez, J. Environmental Electrochemistry: Fundamentals and Applications in Pollution Abatement. 1997 (no month). Academic Press, Inc. pp. 363-378.*
Laboratory Experiments for AP Chemistry. "Experiment 23: Electrolysis." (no date). Retrieved from: <http://www.ahisd.net/campuses/ahhs/academics/pdf/science/APlab23.pdf> on Apr. 1, 2013.*
Comninellis, Ch. and Nerini, A. "Anodic oxidation of phenol in the presence of NaCl for wastewater treatment" Journal of Applied Electrochemistry. Jan. 1995. vol. 25, Issue 1. pp. 23-28.*
R.R. Miller-Folk and R.E. Noftle. "Electron transfer reactions at Ebonex ceramic electrodes" Journal of Electroanalytical Chemistry. Dec. 1989. vol. 274, Issues 1-2. pp. 257-261.*
International Search Report for Application No. PCT/EP2009/058945 dated Oct. 15, 2009. 4 pages.
Meifen Wu, et al., "Applicability of Boron-Doped Diamond Electrode to the Degradation of Chloride-Mediated and Chloride-Free Wastewaters", Journal of Hazardous Materials, 2009, p. 26-31.

* cited by examiner

*Primary Examiner* — Steven A. Friday
(74) *Attorney, Agent, or Firm* — Lucas & Mercanti, LLP

(57) ABSTRACT

There is disclosed a treatment process of wastes containing organic molecules with electron-withdrawing groups on conjugated unsaturated bonds, for instance belonging to aromatic rings. The process comprises an electrochemical reduction step and a simultaneous or subsequent oxidation step, optionally also of electrochemical nature.

9 Claims, No Drawings

METHOD FOR TREATING INDUSTRIAL WASTE WATERS

CROSS-REFERENCE TO RELATED APPLICATION

This application is a continuation of PCT/EP2009/058945 filed Jul. 14, 2009, that claims the benefit of the priority date of Italian Patent Application No. MI2008A001282 filed Jul. 15, 2008, the contents of which are herein incorporated by reference in their entirety.

FIELD OF THE INVENTION

The invention relates to an electrochemical process of abatement of organic species, particularly useful for the treatment of industrial wastes.

BACKGROUND OF THE INVENTION

Several kinds of electrochemical treatments are used for treating industrial and civil exhausts. Among the most common applications, processes producing active chlorine, ozone, peroxides and other active radical species are known, besides electro-oxidative processes for abating microbiological species and for destroying mostly organic species. In the case of aqueous wastes of high organic concentration, electrochemical oxidation treatments are in most of the cases the only alternative to incineration processes, which turn out to be expensive due to the high amount of energy associated with the evaporation of the aqueous fraction and which in any case require a subsequent treatment of gaseous discharges.

There exist, however, wide families of organic species commonly present in industrial process discharges which cannot be subjected to electrochemical oxidation due to their tendency to polymerise at the anode, forming compact, adhering, and non-conductive films rapidly deactivating their functions. The most common example of species unsuitable for anodic electro-oxidation treatments are organic molecules presenting conjugated or aromatic unsaturated bonds, whose reactivity with respect to polymerisation is notoriously increased by the concurrent presence of electron-withdrawing substituents, which may act as leaving groups in nucleophilic substitution reactions, starting a process of chain polymerisation with other molecules of the same species. Chlorinated derivatives on the ring of benzoic acid or of trifluorobenzene are just one of the most typical examples of substances present in industrial wastes for which no appropriate abatement strategy exists at present, and that subjected to electro-oxidation form pitch which may deactivate industrially used anodes. Such compounds may be utilised either per se, or as an intermediate of synthesis of highly fluorinated aromatic compounds in the pharmaceutical industry, in the formulation of herbicides and dyes, in the synthesis of chelating polymers or in manufacturing of liquid crystals.

Another field in which it is necessary to identify efficient and cheap processes of organic species abatement is the reclamation of aquifer layers from polluting species derived from agricultural treatments, herbicides in particular. For example, the systemic herbicides of the family of picolinic acid derivatives (such as picloram, or 4-amino-3,5,6-trichloro-2-pyridinecarboxylic acid) have a tendency to a poor adhesion to the soil and to be leached until reaching the aquifer layers. Also for the abatement of this kind of molecule, both as an industrial exhaust of the relevant synthesis process and as a contaminant of water, it is necessary to identify an effective and cheap treatment, since for the time being there does not exist any suitable alternative, either of chemical or of electrochemical type, to incineration.

SUMMARY OF THE INVENTION

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. As provided herein, the invention comprises, under one aspect a process of treatment of aqueous solutions containing organic species with at least one carbon atom being the site of an optionally aromatic conjugated unsaturated bond provided with an electron-attracting substituent, comprising a reduction step at the cathode of an electrochemical cell and a simultaneous or subsequent oxidation step. In another aspect the invention comprises an electrochemical cell for the treatment of an aqueous solution comprising an undivided reaction chamber, at least one cathode and at least one anode, means for feeding between the cathode and the anode the aqueous solution to be treated containing one or more organic species with at least one carbon atom involved in an optionally aromatic conjugated unsaturated bond, said carbon atom having an electron-attracting substituent, means for withdrawing the treated solution, and means for the controlled application of direct electrical current To the accomplishment of the foregoing and related ends, the following description sets forth certain illustrative aspects and implementations. These are indicative of but a few of the various ways in which one or more aspects may be employed. Other aspects, advantages, and novel features of the disclosure will become apparent from the following detailed description.

DESCRIPTION

Several aspects of the invention are set forth in the appended claims.

In one embodiment, the invention relates to a process of treatment of aqueous solutions containing organic species with at least one carbon atom being the site of an optionally aromatic conjugated unsaturated bond provided with an electron-attracting substituent, comprising a reduction step at the cathode of an electrochemical cell and a simultaneous or subsequent oxidation step, which may also be of electrochemical nature. Without wishing to limit the invention to a particular theory, it might be generally supposed that the electrochemical reduction step tends to attack precisely those electron-attracting substituents making the conjugated unsaturated bonds so prone to polymerising during the oxidation phase. In the case of aromatic species, the withdrawal of electron-attracting substituents out of the ring can have the effect of destabilising the molecule to be destroyed, and the treatment can be completed by an oxidation step that may consist of a simple exposure of the solution to air. In other cases, it is possible to carry out an electrochemical anodic oxidation treatment in the same cell where the reduction step is effected or in a second cell downstream the former one.

In one embodiment, the reduction and the oxidation step are simultaneous and are carried out in an undivided cell equipped with suitable cathode and anode.

In one embodiment, the oxidation step is subsequent to the reduction step and the two steps are carried out in the same undivided cell, provided with suitable cathode and anode, by increasing the current density upon completion of the reduction step.

In one embodiment, the reduction step is carried out at low current density, not higher than 1 kA/m².

In one embodiment, a reduction step carried out at low current density, not higher than 1 kA/m², is followed by an oxidation step at higher current density, for instance comprised between 1 and 3 kA/m². The testing showed as a matter of fact as carrying out the reduction at a limited current density, for instance 0.6 kA/m², allows minimising the onset of concurrent anodic polymerisation processes before the reduction itself is completed.

The choice of the more appropriate embodiment may be effected by one skilled in the art depending on the species to be treated. The process as described may be applied to a wide range of organic molecules with conjugated unsaturated bonds, optionally aromatic. The process can be applied to substances with phenyl, pyridine, pyrrole, thiophene rings with at least one electron-attracting substituent on the aromatic ring. The electron-attracting substituents may comprise one or more of halogens or nitrile, thiocyanate, isothiocyanate, amide, nitryl, carbonyl, carboxyl, sulphoxyl, mesyl and acetyl groups.

In one embodiment, an electrochemical cell for carrying out the treatment process as described comprises a metal cathode of silver, nickel, titanium or a graphite or a ceramic cathode, for instance based on titanium suboxide.

In one embodiment, an electrochemical cell for carrying out the treatment process as described comprises an anode of a valve metal, for instance titanium, coated with noble metal oxides, for instance ruthenium and/or iridium oxides.

In one embodiment, an electrochemical cell for carrying out the treatment process as described may comprise an undivided reaction chamber, that is with no separator between cathode and anode, means for feeding a solution to be treated within the gap between cathode and anode, and means for controlled application of a direct current between cathode and anode.

The cathode may be arranged as a structure provided with openings, for instance in the form of a mesh or expanded sheet. This can have the advantage, especially in the case of processes with simultaneous reduction and oxidation steps, of evolving hydrogen—a common by-product of the process—mainly on the back side of the cathode, rather than inside the cathode-to-anode gap. In this way, it is possible to keep a more reduced gap between cathode and anode without excessively perturbing the performances of the anode used for the oxidation step.

In one embodiment, the means for applying a direct current are controlled or programmed so as to impose a current density lower than 1 kA/m² at least during the reduction step, and optionally a current of higher density, for instance comprised between 1 and 3 kA/m², in a subsequent oxidation step.

The invention will be better understood by aid of the following examples, which shall not be intended as a limitation of the scope thereof.

Example 1

Two industrial wastes released by corresponding units of a manufacturing plant of picloram (4-amino-3,5,6-trichloro-2-pyridinecarboxylic acid, whose structural formula is reported below) were sampled.

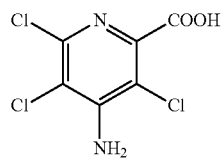 [SMILES: Nc1c(Cl)c(Cl)nc(C(=O)O)c1Cl]

A 200 ml sample of the former waste, withdrawn at ambient temperature and pH 14, of muddy appearance and dark orange colour, was fed to a first undivided electrochemical cell equipped with a silver plate as the cathode and with a DSA® anode from Industrie De Nora consisting of a titanium plate coated with a protective layer based on titanium and tantalum oxides and a catalytic layer based on tantalum and iridium oxides. A direct current of limited extent (corresponding to 0.6 kA/m²) was applied, in order to start the cathodic reduction of picloram but not an anodic oxidation thereof of perceptible extent; a cell voltage of 3.5 V was recorded. Upon transferring 27 Ah of electric charge, the alkalinity of the solution dropped to pH 9. The solution was then transferred to a second undivided electrochemical cell, equipped with a titanium expanded sheet as the cathode and with a DSA® anode from Industrie De Nora consisting of a titanium expanded sheet coated with a catalytic layer based on titanium and ruthenium oxides. A direct current was applied at 2 kA/m², with a cell voltage of 4 V. Upon transferring 84.5 Ah of electric charge, the solution had reached a neutral pH and a very pale colouring, with no trace of the initial turbidity. No fouling of the anodic surface was observed. At the end of the test, the total organic carbon (TOC) determination gave a value of 168 ppm, versus 1990 ppm detected initially. According to the recorded data, the energy consumption required for abating 90% of the TOC in the treated solution resulted lower than 2.2 kWh/l.

A 200 ml sample of the latter waste, withdrawn at ambient temperature and pH 3, of muddy appearance and yellowish colour, was sequentially fed to the two above electrochemical cells and subjected to the same reduction and subsequent oxidation treatments. The reduction was again carried out at a current density of 0.6 kA/m² with a 3.5 V voltage. Upon transferring 27.6 Ah of electric charge, the acidity of the solution dropped to pH. After the transfer to the second cell, the subsequent oxidation step was carried out at 2 kA/m², with a cell voltage of 4 V. Upon transferring 84.0 Ah of electric charge, the solution had reached pH 8 and a clear and transparent appearance. Also in this case, no fouling of the anodic surface was observed. At the end of the test, the total organic carbon (TOC) determination gave a value of 22 ppm, versus 2310 ppm detected on the original waste. According to the recorded data, the energy consumption required for abating 99% of the TOC in the treated solution resulted lower than 2.2 kWh/l.

Example 2

The two wastes of Example 1 were subjected to a simultaneous oxidation and reduction treatment in the second undivided electrochemical cell, equipped with a titanium expanded sheet as the cathode and with a DSA® anode from Industrie De Nora consisting of a titanium expanded sheet coated with a catalytic layer based on titanium and ruthenium oxides. The selected anode type allows the onset of the anodic reaction even at a very limited current density on the sole species pre-reduced at the facing cathode.

The former waste at pH 14 was thus fed applying a direct current at 0.6 kA/m², with a cell voltage progressively rising from the initial 3.5 V to 4.5 V. Upon transferring 50 Ah of electric charge, the solution reached pH 8.5 and a clear aspect with a very pale colour. At the end of the test, the total organic carbon (TOC) determination gave a value of 232 ppm, versus 1990 ppm detected on the original waste.

The latter waste at pH 3 was then fed applying a direct current at 0.6 kA/m², with a cell voltage progressively rising from the initial 3.5 V to 4.5 V. Upon transferring 48 Ah of electric charge, the solution had reached a neutral pH and a clear and colourless appearance. At the end of the test, the total organic carbon (TOC) determination gave a value of 54 ppm, versus 2310 ppm detected on the original waste.

In neither of the two tests was there observed any fouling of the anodic surface.

Counterexample 1

200 ml of the former waste of Example 1 was fed to a tubular electrochemical cell equipped with a DSA® anode from Industrie De Nora consisting of a titanium cylinder coated with a catalytic layer based on titanium and ruthenium oxides, and with a coaxial cathode of stainless steel mesh wrapped in multiple layers having a surface area equal to 50 times the anode surface area. The cell was supplied with direct electrical current, at an anodic current density of 2 kA/m², in order to accomplish a direct oxidation of picloram in the absence of an appreciable reduction. The appearance of the solution changed during the first 30 minutes of reaction, during which the cell voltage climbed from the initial value of 4 V to more than 6.5 V. It was hence necessary to shut-down and dismantle the cell. At the end of the test, the anodic surface was covered by a compact brown-orange coloured film, which was impossible to remove without damaging the catalytic layer.

Example 3

An industrial waste was sampled, coming from a manufacturing plant of benzene fluorinated derivatives, containing various amounts of the following organic species in an 80% sulphuric solution:

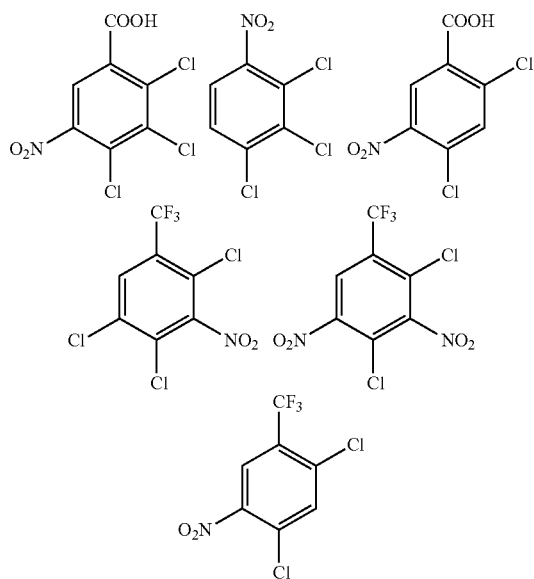

The total organic content (TOC) on the original sample was 5610 ppm. A 200 ml sample, of totally opaque appearance and blackish colour, was fed to a first undivided electrochemical cell equipped with an Ebonex® ceramic cathode from Atranova based on unmodified titanium suboxide, and with an Ebonex® anode equivalent to the cathode but coated with an iridium oxide-based catalytic layer. A direct current of limited extent (corresponding to 0.6 kA/m²) was applied, in order to allow the onset of the cathodic reduction of the species to be treated without starting concurrent anodic oxidation processes of appreciable entity; an initial cell voltage of 6 V was recorded, progressively dropped to 4 V in the course of a 22 Ah electric charge transfer; the current density was then raised to 1.5 kA/m², with a cell voltage of 5 V. Upon transferring 22.75 Ah of electric charge, the solution had assumed a transparent appearance with an intense yellow colouring. At the end of the test, the total organic carbon (TOC) determination gave a value of 483 ppm. No fouling of the anodic surface was observed.

Counterexample 2

200 ml of the waste of Example 3 was fed to the same cell equipped with Ebonex® electrodes. A current density of 1.5 kA/m² was applied between the electrodes; the cell voltage, initially higher than 6.5 V, climbed quickly until making the continuation of the process impossible, forcing its shut-down. upon dismantling the cell, it was observed how the anodic surface was covered by a compact film of blackish colour, impossible to remove without damaging the catalytic layer.

The above description shall not be intended as a limitation the invention, which may be practised according to different embodiments without departing from the scopes thereof, and whose extent is solely defined by the appended claims. Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the invention before the priority date of each claim of this application.

What we claim is:

1. Process of abatement of the Total Organic Content in an aqueous solution comprising the steps of:
    subjecting the aqueous solution containing organic compounds having electron-withdrawing substituents to a cathodic reduction treatment by feeding a first current density to a first undivided electrochemical cell equipped with at least one cathode, wherein the cathode is made of silver, titanium, graphite or titanium suboxide, and at least one anode, the anode is made of valve metal or titanium suboxide coated with noble metal oxides; and
    subjecting the treated aqueous solution to an anodic oxidation treatment by feeding a second current density to a second undivided electrochemical cell equipped with at least one cathode made of silver, titanium, graphite or titanium suboxide, and with at least one anode made of a valve metal or titanium suboxide coated with noble metal oxides,
    wherein the aqueous solution contains one or more organic species with at least one carbon atom being the site of an aromatic conjugated unsaturated bond provided with electron-attracting substituent, the electron-attracting substituent is one or more of halogen, nitrile, thiocyanate, isothiocyanate amide, nitryl, carbonyl, sulphoxyl, mesyl and acetyl groups, and wherein the second current density in the oxidation step is higher than the first current density in the reduction step.

2. The process according to claim 1, wherein the one or more organic species contained in the aqueous solution to be treated comprises one or more of halogenated derivatives of picolinic acid, of benzoic acid and of benzotrifluorides.

3. The process according to claim 1, wherein the anode of the second undivided cell is titanium expanded sheet coated with a catalytic layers comprising titanium and ruthenium oxides.

4. The process of claim 1, wherein the first current density in the reduction step is not higher than 1 kA/m$^2$ and the second current density in the oxidation step is between 1 and 3 kA/m$^2$.

5. Process of abatement of the Total Organic Content in an aqueous solution containing one or more organic species, the process comprising the steps of:
   subjecting the aqueous solution to a first current density in a first cathodic reduction treatment; and thereafter
   subjecting the treated aqueous solution to a second current density in an anodic oxidation treatment in the same undivided cell equipped with at least one cathode made of silver, titanium, graphite or titanium suboxide and at least one anode made of valve metal or titanium suboxide coated with noble metal oxides, wherein the aqueous solution contains one or more organic species with at least one carbon atom being the site of an aromatic conjugated unsaturated bond provided with electron-attracting substituent, the electron-attracting substituent is one or more of halogen, nitrile, thiocyanate, isothiocyanate amide, nitryl, carbonyl, sulphoxyl, mesyl and acetyl groups, and wherein the second current density in the oxidation step is increased upon completion of the reduction step.

6. The process of claim 5, wherein the the subsequent anodic oxidation step is carried out at a current density of between 1 and 3 kA/m$^2$.

7. A process of abatement of Total Organic Content in an aqueous solution containing organic compounds having electron-withdrawing substituents comprising subjecting the aqueous solution containing organic compounds having electron-withdrawing substituents to an electrochemical treatment carried out in an undivided cell comprising a cathode made of silver, titanium, graphite or titanium suboxide and an anode made of valve metal or titanium suboxide coated with catalytic noble metal oxides, the electrochemical treatment comprising a cathodic reduction step, the cathodic reduction step is carried out at a current density not higher than 1 kA/m$^2$ so as to withdraw the electron-withdrawing substituents of the organic compounds and produce destabilized organic compounds, and minimize an onset of concurrent anodic polymerization, and a subsequent anodic oxidation step, the subsequent anodic oxidation step of the destabilized organic compounds are carried out at a current density higher than 1 kA/m$^2$.

8. The process according to claim 7, wherein the organic compounds are derivatives of picolinic acid, chlorinated and fluorinated aromatic compounds.

9. The process according to claim 7, wherein the subsequent anodic oxidation step is carried out at a current density of between 1 and 3 kA/m$^2$.

* * * * *